United States Patent Office 3,451,818
Patented June 24, 1969

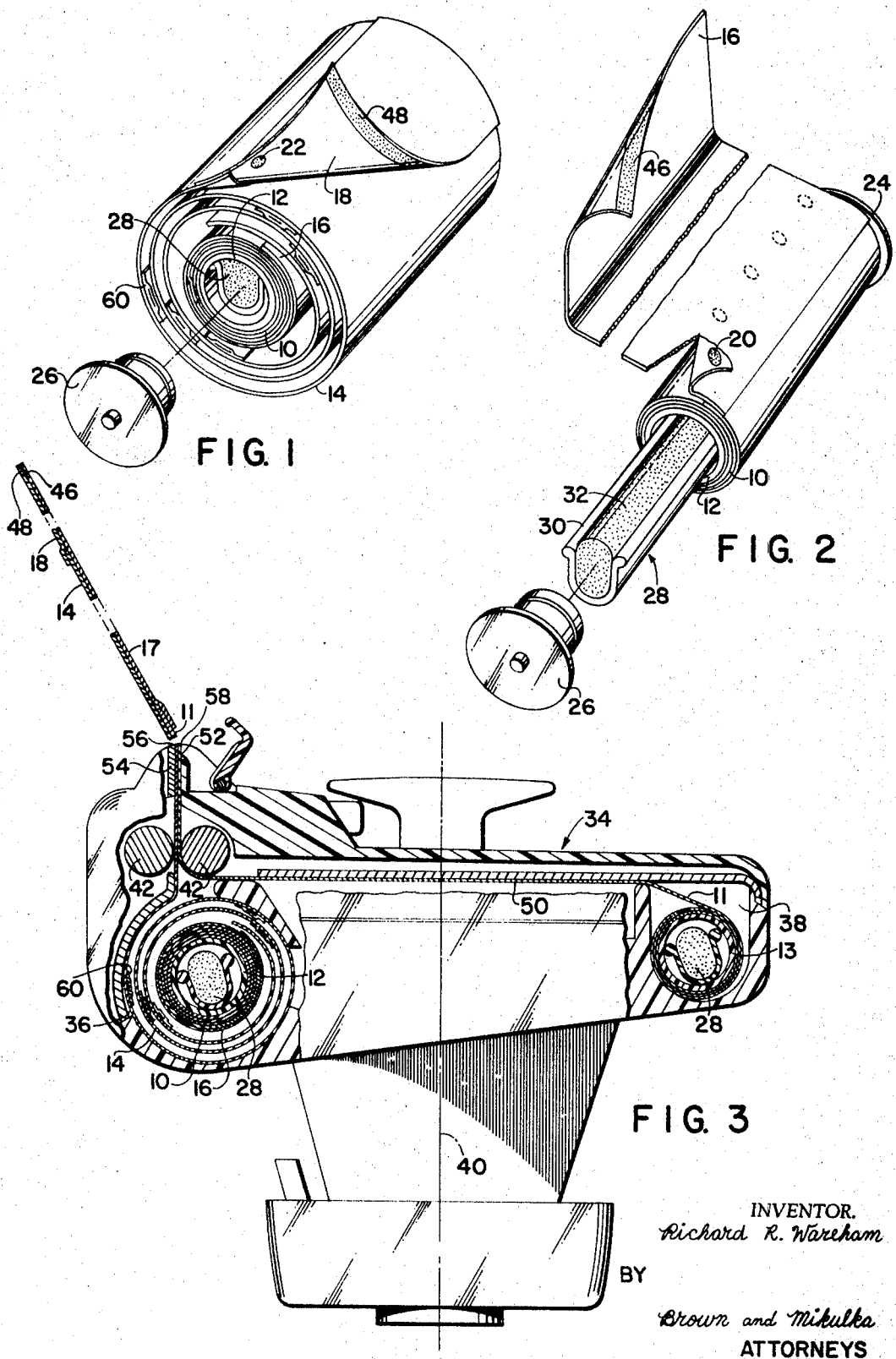

3,451,818
COMPOSITE ROLLFILM ASSEMBLY FOR USE IN THE DIFFUSION TRANSFER PROCESS
Richard R. Wareham, Marblehead, Mass., assignor to Polaroid Corporation, Cambridge, Mass., a corporation of Delaware
Filed Apr. 19, 1966, Ser. No. 543,716
Int. Cl. G03c 3/02; G03b 19/04
U.S. Cl. 96—78
5 Claims This invention relates to a format and assembly for photographic materials, and more particularly to such for materials adapted for photography according to the diffusion transfer process.

The photographic materials required by certain cameras adapted for photography according to the diffusion transfer process include a wound assembly of negative photographic film and a separately wound image-receiving sheet for the production of positive photographic prints. Prior to this invention such materials have been packaged by enclosing within an appropriate container: a wound negative film, a seperately wound image-receiving sheet and, under some circumstances, an applicator for applying a protective coating to the photographic print. This assembly of several separate and distinct items has disadvantages including those of being awkward to handle during installation of the photographic materials into the camera and of requiring an undesirably large package.

The subject of this invention constitutes a novel composite assembly for the above photographic materials which may be more easily handled during installation and which may also be more advantageously packaged.

It is an object of this invention to provide a compact assembly of materials for the production of photographic prints according to the diffusion transfer process.

It is a further object to provide a compact assembly for a plurality of photographic materials used in photography according to the diffusion transfer process from which the materials are individually presented for use in a convenient manner.

It is also an object to provide a composite assembly of photographic materials wherein a strip of negative film is wound into a coil and a strip of image-receiving material is wound upon the negative film coil.

Other objects of this invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is a perspective view of the complete assembly of photographic materials;

FIG. 2 is an exploded perspective view showing certain portions of the assembly of FIGURE 1; and FIG. 3 is a partially broken away view of the photographic materials forming the assembly operatively installed in a camera.

In the wound assembly of photographic materials shown in FIGURE 1, a strip of negative photographic film 10 is wound on spool 12 to form a film roll and a strip of image-receiving material 14 is wound on the roll over the negative film. The negative film and the image-receiving material are provided with opaque leader 16 and leader 18, respectively. These leaders aid in establishing proper alignment of negative film 10 and material 14 within the camera and further aid in the withdrawal of the ends of film 10 and material 14 from the camera in the established alignment. Leader 16 also co-operates with end portions 24 and 26 of spool 12 to exclude light from the photosensitive surface of the wound negative film.

As best shown in FIG. 2, leader 16 for negative film 10 is provided with conventional adhesive means 20, such as pressure sensitive tape or the like, for releasably securing leader 16 to the outer convolution of film 10 to hold the film securely in its wound condition. Similar adhesive means 22 is applied to leader 18 for securing it to the outer convolution of the wound strip of image-receiving material to also hold this material in a wound condition.

Prints produced from certain materials according to the diffusion transfer process require a coating of the type described in E. H. Land U.S. Patent No. 2,719,791, to stabilize and otherwise protect the same. Prints produced from certain other photographic materials according to the diffusion transfer process do not require such a coating. An applicator 28, for applying the coating to photographic prints is thus optionally includable in the assembly of this invention according to the requirements of the photographic materials being assembled. To facilitate inclusion of the applicator when required, spool 12 is hollow such that a chamber is formed therein and end 26 thereof is removable to form a conventional fluid tight closure to prevent the possible leakage of coating fluid from the chamber. Applicator 28 is stored in the chamber and access thereto is obtained by removal of end 26.

The applicator is of a known type, such as that shown and described in A. J. Bachelder U.S. Patent No. 2,759,-212, and includes absorbent pad 32 which is saturated with the coating fluid and handle 30. Absorbent pad 32 is adapted to be wiped over the finished positive print to apply the protective coating thereto.

A camera 34, for utilizing the film assembly of this invention is shown in FIG. 3. A first chamber 36 and a second chamber 38 are disposed on opposite sides of optical axis 40 of the camera and a pair of pressure rollers 42 are mounted adjacent chamber 36.

Initial installation of an assembly constructed according to this invention into camera 34 is facilitated by use of original negative film 11, without image-receiving material wound thereon, in conjunction with image-receiving material 14 of the initially used assembly. Negative film 10, which is accessable only after removal of material 14 from the assembly, is uncovered by removal of image-receiving material 14 and is usable in conjunction with the image-receiving material of a subsequent film assembly.

Film supply 11 is installed in chamber 38 and a complete film assembly is placed in chamber 36. Leader 18 of material 14 is drawn between pressure rollers 42. Leader 17 of the film 11 is then drawn across focal plane 50 of the camera, between the rollers 42 and spliced to leader 18. Adhesive strips are applied to the leaders to facilitate the splicing operation. All negative film leaders include adhesive strip 46 and leader 18 for image-receiving material 14 includes a similar adhesive strip 48. The adhesive may be of the well-known type which adheres only to itself or it may be of any other suitable type. The spliced leaders 17 and 18 are pulled to rupture adhesive 20 of film 11, not shown, and adhesive 22 of material 14 and to draw the leaders between rollers 42 and out through slot 52. This withdrawal positions the first photosensitive portion of the negative film for exposure and positions a portion of material 14 for subsequent print production. A conventional indexing means, not shown, terminates withdrawal of the negative film and material 14 at the proper place. The indexing means may be of the type shown and described in E. W. Eburn, Jr., U.S. Patent No. 2,935,004. When withdrawal is terminated leaders 17 and 18 are torn off against cutting edge 54, leaving new leading edges 56 and 58.

Subsequent to exposure of a portion of film 11, leading edges 58 and 56 of the negative film and image-receiving material 14 respectively, are pulled to draw a portion of material 14 and the exposed portion of film 11 into superposition between rollers 42 and out slot 52. The rollers rupture pod 60 of developing fluid, which is mounted between strips 11 and 14 at the leading edge of each frame, and spread its contents between the superposed strips so that development by the diffusion transfer takes place. Various types of such fluid containing pods are described in U.S. Patent No. 2,543,181, issued to E. H. Land. The withdrawn portions of film 11 and material 14 are severed from the remaining portions thereof by being drawn against blade 54. The previously mentioned indexing means again terminates withdrawl of film 11 and material 14 from the camera so as to appropriately position succeeding portions thereof for exposure and development and for print production, respectively. This operation is repeated until film 11 in chamber 38 and material 14 in chamber 36 have been exhausted. The negative film and the strip of image-receiving material 14 are substantially equal in length so that they will be simultaneously exhausted.

Spool 12 having negative film supply 10 wound thereon remains in chamber 36 after exhaustion of the image-receiving material and spool 13, having no photographic material wound thereon, remains in chamber 38. Spool 13 is removed from chamber 38 and spool 12 having negative film 10 wound thereon is transferred from chamber 36 to chamber 38, thus refurnishing chamber 38 with negative film. A complete assembly of photographic material is then installed in chamber 36 to renew the supply of image-receiving material 14. The camera is thus fully equipped for further operation. If an applicator 28 is stored in the spool removed from chamber 38, it may serve as a replacement for the previous applicator.

This invention thus provides a novel and compact assembly of photographic materials from which the materials are presented for use in a convenient manner.

Since certain changes may be made in the above assembly without departing from the scope of the invention herein involved, it is intended that all matter contained in the above description or shown in the drawings shall be interpreted as illustrative and not in a limiting sense.

What is claimed is:

1. An assembly of photographic materials for use in a camera adapted for photography according to the diffusion transfer process comprising:
   (a) a strip of negative photographic film wound into a helical coil, the leading end of said strip being adjacent the outer convolution of said coil and the trailing end of said strip being adjacent the inner convolution of said coil; and
   (b) a strip of image-receiving material helically wound upon said coiled strip of negative film such that the trailing end of said image-receiving strip is adjacent but unattached to said leading end of said negative film strip, the leading end of said image-receiving strip being adjacent the outer convolution thereof.

2. An assembly of photographic materials for use in a camera adapted for photography according to the diffusion transfer process comprising:
   (a) a strip of negative photographic film wound into a helical coil, the leading end of said strip being adjacent the outer convolution of said coil and the trailing end of said strip being adjacent the inner convolution of said coil;
   (b) means for releasably maintaining said strip of negative film in said wound condition;
   (c) means for excluding light from at least a predetermined portion of the photosensitive surface of said strip of negative film while said strip is maintained in said wound condition; and
   (d) a strip of image-receiving material helically wound upon said coiled strip of negative film such that the trailing end of said image-receiving strip is adjacent but unattached to said leading end of said negative film strip, the leading end of said image-receiving strip being adjacent the outer convolution thereof.

3. The combination of claim 2 wherein:
   said assembly further comprises a spool on which said negative film is wound.

4. The combination of claim 3 wherein:
   (a) said spool forms a hollow cartridge having at least one removable end; and
   (b) said assembly of photographic materials further comprises a coating applicator disposed within said hollow cartridge.

5. An assembly of photographic materials for use in a camera adapted for photography according to the diffusion transfer process incorporating first and second wound photographic sheet material receiving chambers disposed on opposite sides of the optical axis of said camera, and a pair of pressure rollers mounted adjacent said first chamber, said assembly comprising:
   (a) a strip of first negative photographic film wound into a helical coil, the leading end of said strip being adjacent the outer convolution of said coil and the trailing end of said strip being adjacent the inner convolution of said coil;
   (b) means for releasably maintaining said strip of negative film in said wound condition;
   (c) means for excluding light from at least a predetermined portion of the photosensitive surface of said strip of negative film while said strip is maintained in said wound condition; and
   (d) a strip of image-receiving material helically wound upon said coiled strip of negative film such that the trailing end of said image-receiving strip is adjacent but unattached to said leading end of said negative film strip, the leading end of said image-receiving strip being adjacent the outer convolution thereof;
   (e) said wound image-receiving strip being adapted for placement in said first chamber of said camera while wound upon said negative film coil for use in conjunction with a second negative film coil in said second chamber, the latter being adapted for movement into superposition with said image-receiving strip between said pair of pressure rollers subsequent to exposure of said second film by said camera, said second film and said image-receiving sheet being substantially equal in length to effect simultaneous exhaustion thereof;
   (f) said first negative film being adapted for use as replacement for said second negative film upon said exhaustion of said second negative film and of said image-receiving sheet.

References Cited

UNITED STATES PATENTS

| | | | |
|---|---|---|---|
| 3,022,170 | 2/1962 | Flinchbaugh et al. | 96—78 |
| 3,270,653 | 9/1966 | Bachelder | 96—78 X |

NORMAN G. TORCHIN, *Primary Examiner.*

RICHARD E. FICHTER, *Assistant Examiner.*

U.S. Cl. X.R.

95—31